United States Patent
Hsiao

(10) Patent No.: US 7,039,309 B2
(45) Date of Patent: May 2, 2006

(54) DRIVE SOURCE OF A CAMERA LENS

(75) Inventor: Cheng-Fang Hsiao, Hsichih (TW)

(73) Assignee: Micro-Mototech Corp., Sanchung (TW)

(*) Notice: Subject to any disclaimer, the term of this patent is extended or adjusted under 35 U.S.C. 154(b) by 72 days.

(21) Appl. No.: 10/774,916

(22) Filed: Feb. 9, 2004

(65) Prior Publication Data

US 2004/0165877 A1   Aug. 26, 2004

(30) Foreign Application Priority Data

Feb. 21, 2003   (TW) .............................. 92202890 U

(51) Int. Cl.
*G03B 17/00* (2006.01)

(52) U.S. Cl. ..................... 396/85; 359/696; 359/824; 310/80

(58) Field of Classification Search ............... 359/696, 359/824; 310/80; 396/85

See application file for complete search history.

(56) References Cited

U.S. PATENT DOCUMENTS

| | | | |
|---|---|---|---|
| 4,743,931 A * | 5/1988 | Matsuzaki et al. | 396/90 |
| 4,763,150 A * | 8/1988 | Sumi | 396/508 |
| 4,828,360 A * | 5/1989 | Maruyama | 359/824 |
| 4,963,000 A * | 10/1990 | Kawai | 359/824 |
| 2003/0007799 A1* | 1/2003 | Aoshima | 396/133 |

\* cited by examiner

*Primary Examiner*—Michael Tokar
*Assistant Examiner*—Rishi Suthar
(74) *Attorney, Agent, or Firm*—Egbert Law Offices

(57) ABSTRACT

A drive source of a camera lens designed with built-in drive motor inside the camera lens mount delivers benefits of eliminating runout occurring during the telescopic movement of the telescopic lens, and simplifying the parts assembly process. The drive source of camera lens comprises a coil stator installed directly to the inside of the camera lens mount, the spindle of the magnetic ring rotor screws onto the rotation-proof telescopic lens, so as to rotate the spindle of the magnetic ring rotor to drive the telescopic lens with external thread. The present invention allows the camera lens to acquire a built-in drive source, eliminates the runout that occurs during the drive of telescopic lens, and simplifies the assembly process.

3 Claims, 4 Drawing Sheets

DRIVE SOURCE OF A CAMERA LENS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a drive source of camera lens, and more particularly to a drive source inside camera lens that places a coil stator directly at the inside of the camera lens mount. The spindle of the magnetic ring rotor is screwed to rotation-proof telescopic lens, in order to rotate the spindle of the magnetic ring rotor and drive the telescopic lens with external thread for telescopic movement. There it forms a camera lens with built-in drive source, and allows the camera lens to acquire a built-in drive source, eliminates the runout that occurs during the drive of telescopic lens, and simplifies the assembly process.

BACKGROUND OF THE INVENTION

The traditional structure of camera lens affixes a drive motor on the outside of a camera lens mount and, through the connection of transmission parts, drives the telescopic lens in telescopic motion. Since the drive position is unilateral, the telescopic lens requires extra transmission parts at the camera lens mount, and often encounters the following drawbacks:

1. Since the drive motor is affixed to the outside of the camera lens mount, the structure of the camera lens is asymmetrical and, thus, affects the spatial disposition of the camera lens module.
2. Since the drive position of drive motor is unilateral, the telescopic lens experiences severe runout in telescopic motion.
3. The drive motor of the camera lens mount requires extra transmission parts to drive the telescopic lens inside the camera lens mount and adds cost and parts to the structure.

BRIEF SUMMARY OF THE INVENTION a. The benefits of the present invention are as follows:
1. The drive motor is directly built inside the camera lens mount 11 to form a symmetrical ring shape to the structure of the camera lens module so as to improve the flexibility of the spatial disposition of the camera lens module.
2. The drive motor delivers omnidirectional drive to eliminate runout occurring during the telescopic motion of the telescopic lens 12.
3. The drive motor inside the camera lens mount 11 requires no additional transmission parts, but uses only the spindle 26 of the magnetic ring rotor 25 to drive the telescopic lens 12 inside the camera lens mount 11 so as to simplify the parts assembly and reduces the cost.

b. The new functions of the present invention are as follows:
1. The stepper motor comprised of coil stator 21 and magnetic ring rotor 25 is affixed directly inside the camera lens module comprised of the camera lens mount 11 and the telescopic lens 12 so as to bring the camera lens with efficiency of built-in drive source.

DETAILED DESCRIPTION OF THE INVENTION a. Technical Problem to be Solved
The present invention builds the drive motor inside the camera lens mount to eliminate runout of the telescopic lens in telescopic motion to simplify the assembly process.
b. Solution
The objective of the present invention is to provide a built-in drive source for camera lens by placing a coil stator directly at the inside of the camera lens mount. The spindle of the magnetic ring rotor is screwed to rotation-proof telescopic lens, in order to rotate the spindle of the magnetic ring rotor and drive the telescopic lens with external thread for telescopic movement. There it forms a camera lens with a built-in drive source, and allows the camera lens to acquire the built-in drive source, eliminates the runout that occurs during the drive of telescopic lens, and simplifies the assembly process.

The features and the advantages of the present invention will be more readily understood upon a thoughtful deliberation of the following detailed description of a preferred embodiment of the present invention with reference to the accompanying drawings.

Figure 1:
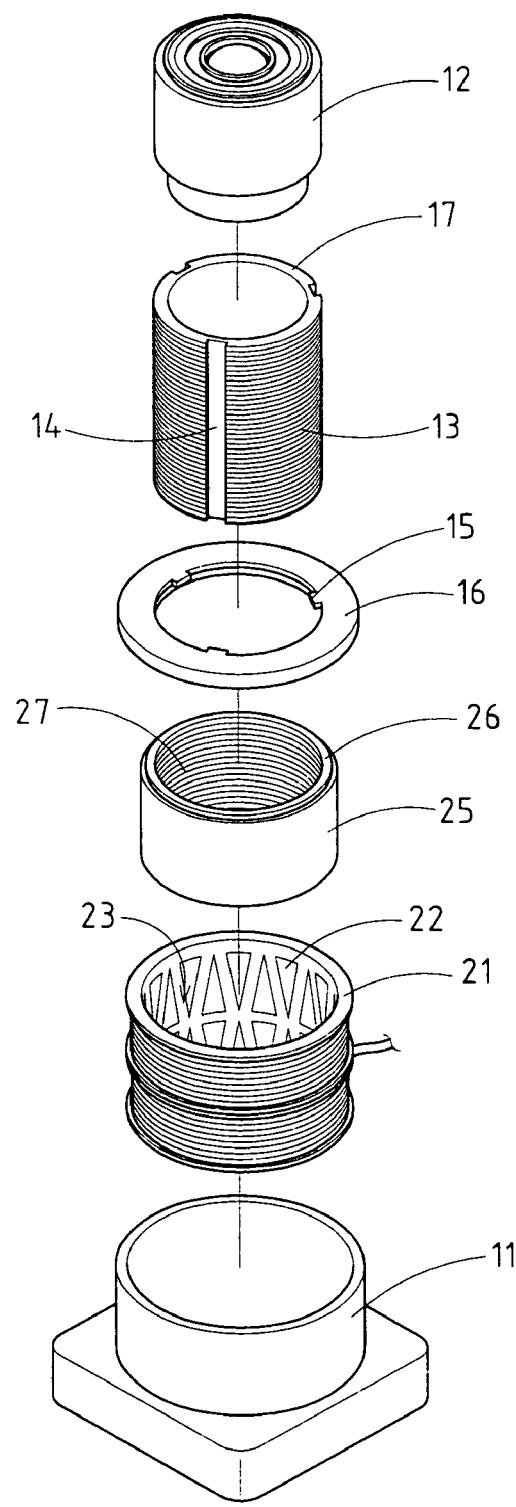
FIG. 1 shows an exploded perspective view of the present invention.
Figure 2:
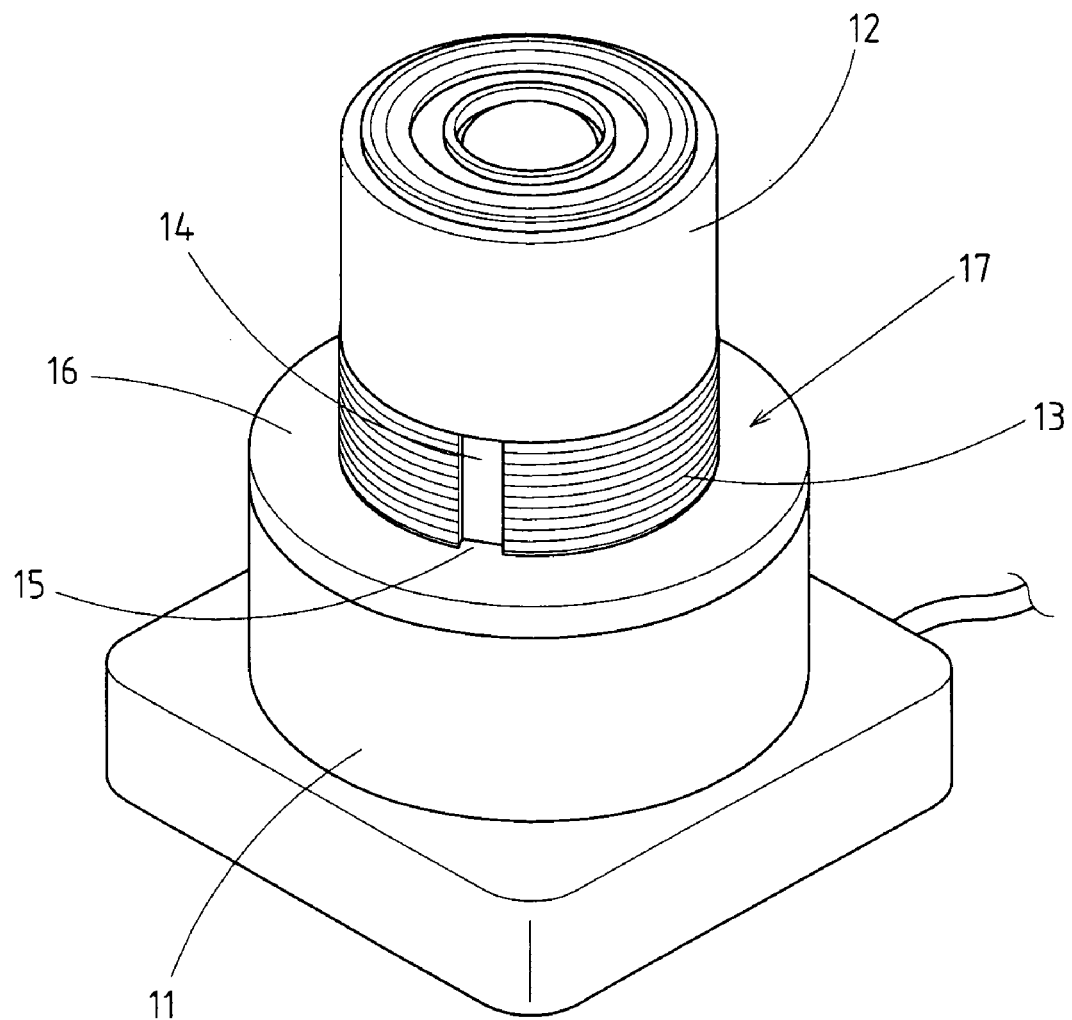
FIG. 2 shows a perspective view of the present invention.

As shown in FIGS. 1–2, there is a drive source of camera lens embodied in the present invention.

Figure 3:
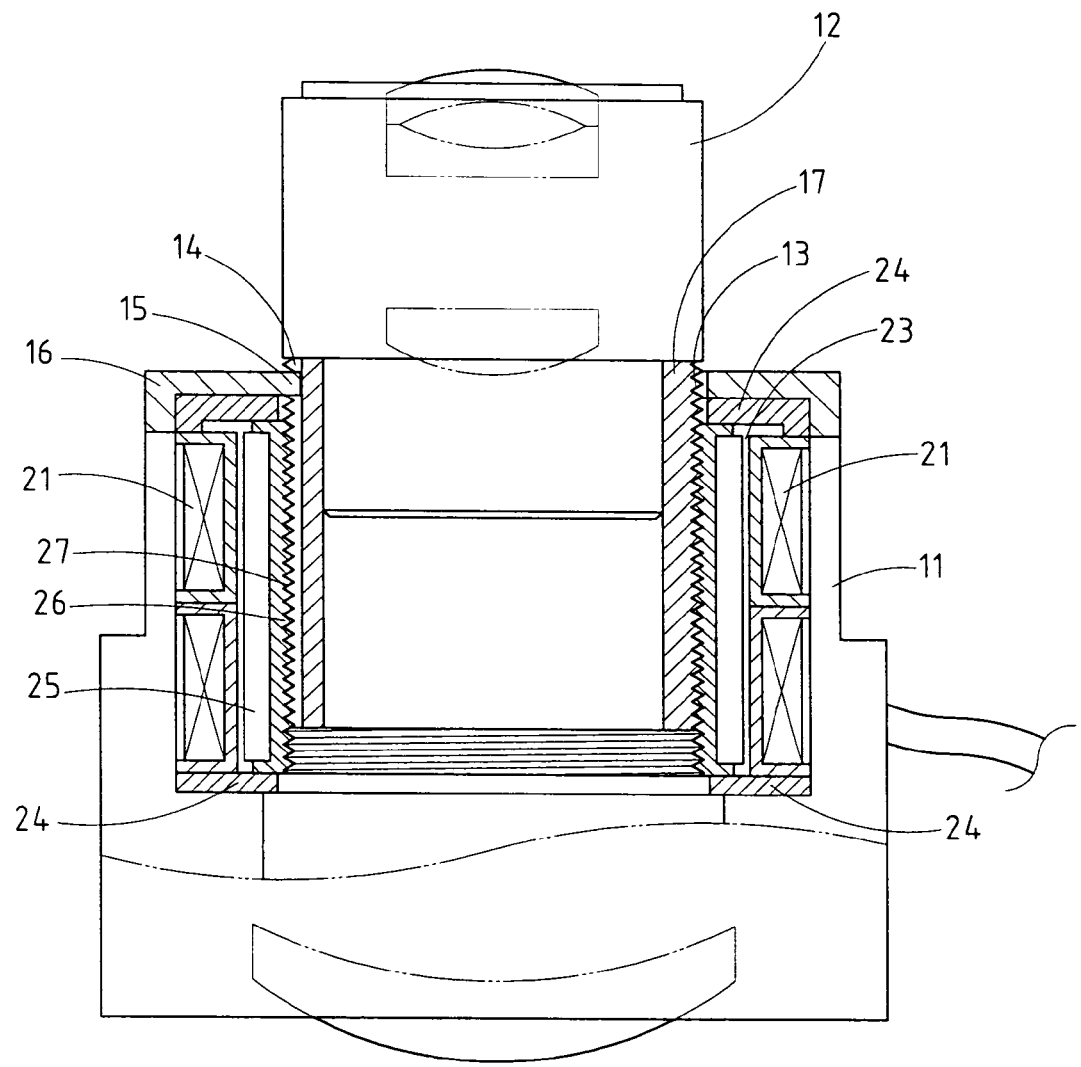
FIG. 3 shows a cross-sectional view of the present invention.
Figure 4:
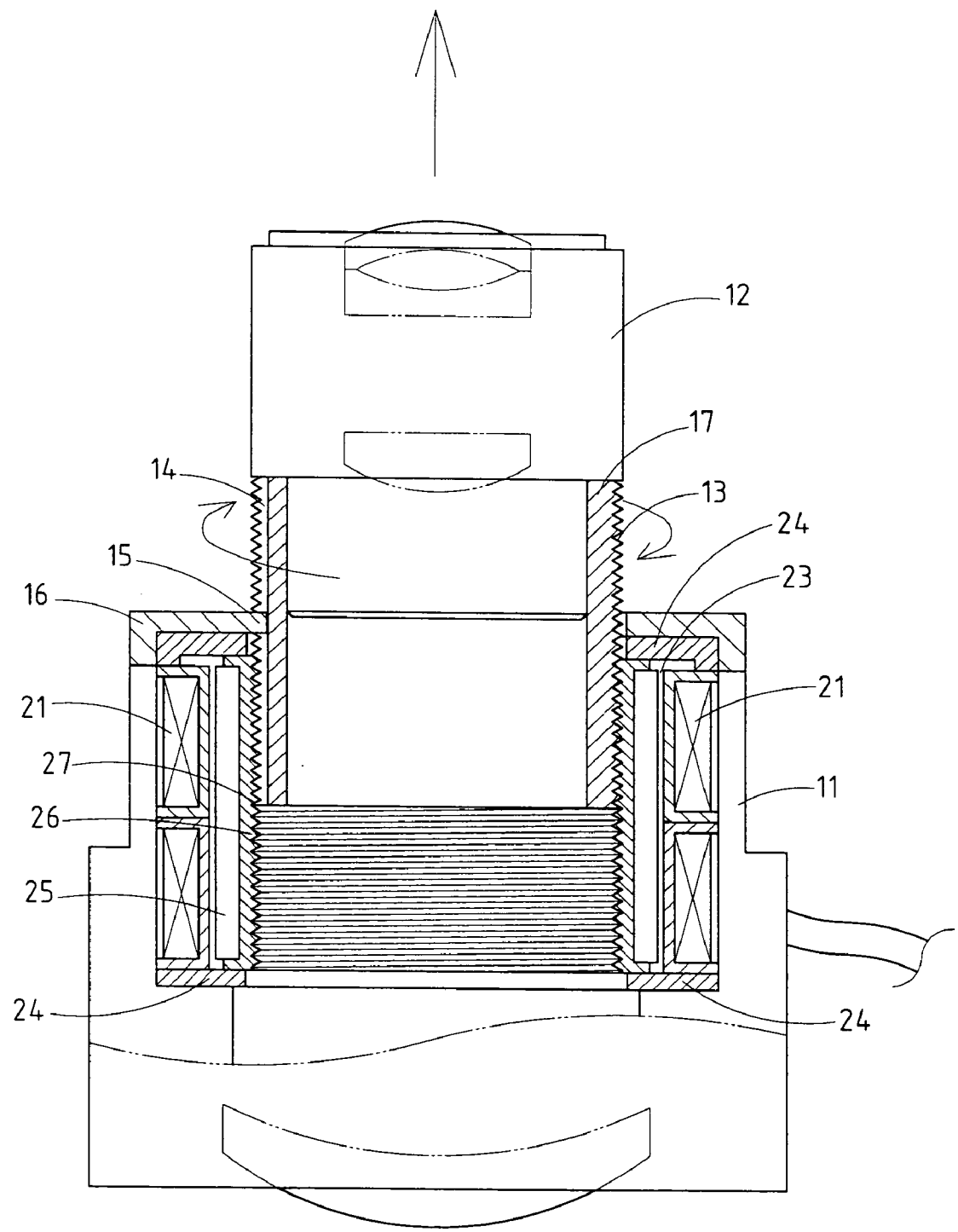
FIG. 4 shows a cross-sectional view of the camera lens in telescopic motion.

The present invention comprises a camera lens comprised of camera lens mount 11 and telescopic lens 12. The drive source comprises a stepper motor consisted of coil stator 21 of multiple pole teeth 22 on the surface inside the ring and magnetic ring rotor 25. The inside of camera lens mount 11 is built with coil stator 21 to place the magnetic ring rotor 25 inside the designated space 23 of the coil stator 21. The external of the telescopic lens 12 is designed with external thread 13 to screw on the internal thread 27 on the inside of the spindle 26 of the magnetic ring rotor. To operate in coordination with the limit traveler 14 outside of the telescopic lens 12 with the rotation-proof device of guide block 15 of camera lens mount 11, and rotate the magnetic ring rotor 25 under the reaction induced by the coil stator 21, the internal thread 27 of the spindle 26 drives the external thread 13 of the telescopic lens 12 for telescopic motion as shown in FIGS. 3, 4, to construct a camera lens with built-in drive source.

The up and down sides of the magnetic ring rotor 25 of the camera lens mount 11 are equipped with thrust ring 24, to limit the axial movement of the magnetic ring rotor 25 and provide thrust reversal to telescopic lens 12 in telescopic motion. The guide block 15 of the camera lens mount 11 can be affixed to a sheath 16, and affix the sheath 16 to the camera lens mount 11, while stabilizing the coil stator 21 inside the camera lens mount 11. The external thread 13 and limit traveler 14 of the telescopic lens 12 can be affixed to the outside peripheral of the lining tube 17 to stabilizing the telescopic lens 12 at the terminal of the lining tube 17 so as to provide telescopic lens 12 convenient assembly.

Therefore, the present invention places the stepper motor comprised of coil stator 21 and magnetic ring rotor 25 inside the camera lens module comprises of built-in camera lens mount 11 and telescopic lens 12. The magnetic ring rotor 25 rotates in reaction to the coil stator 21 to replace and simplify the extra transmission parts. The guide block 15 of camera lens mount 11 couples with the limit traveler 14 of the telescopic lens 12, and reacts to the internal thread 27 inside of the spindle 26, then results in stable telescopic movement of the telescopic lens 12 with external thread 13. The spindle 26 of the magnetic ring rotor 25 in the ring-shaped omnidirectional telescopic lens 12 can fully eliminate the runout occurs in telescopic movement of the telescopic lens 12. Also, the stepper motor built inside the camera lens mount 11 offer symmetrical structure to the camera lens module and improves the flexibility of the spatial disposition of the camera lens so as to acquire built-in drive source, eliminates the runout occurs during the drive of telescopic lens, and simplifies the assembly process.

I claim:

1. A drive apparatus for a camera lens comprising:
a camera lens mount having a guide block affixed thereto;
a telescopic lens having an external thread connected thereto;
a stepper motor having a coil stator with multiple pole teeth therein, said stepper motor having a magnetic ring rotor positioned in said coil stator so as to be in driving relation therewith, said coil stator received within said camera lens mount, said magnetic ring rotor having a spindle affixed to an interior wall thereof, said spindle having an internal thread threadedly engaged with said external thread of said telescopic lens, said telescopic lens having a travel limiting slot formed longitudinally along an exterior surface thereof, said travel limiting slot coupled with said guide block such that said telescopic lens is in non-rotatable relation to said camera lens mount, said magnetic ring rotor being rotatable in reaction to said coil stator, said camera lens mount having a thrust ring at an end of said magnetic ring motor so as to limit an axial movement of said magnetic ring rotor.

2. The drive apparatus of claim 1, said guide block being affixed to a sheath, said sheath secured to said camera lens mount and to said coil stator.

3. The drive apparatus of claim 1, further comprising:
a lining tube affixed to said telescopic lens, said external thread and said travel limiting slot being affixed to a peripheral surface of said lining tube.

* * * * *